US012640455B2

(12) United States Patent
Sandberg et al.

(10) Patent No.: US 12,640,455 B2
(45) Date of Patent: May 26, 2026

(54) TUNABLE WAVEGUIDE RESONATOR

(71) Applicant: Telefonaktiebolaget LM Ericsson (publ), Stockholm (SE)

(72) Inventors: Jan Sandberg, Frillesås (SE); Per Ligander, Gothenburg (SE); Jonas Gustavsson, Bredared (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 473 days.

(21) Appl. No.: 17/919,084

(22) PCT Filed: Apr. 15, 2020

(86) PCT No.: PCT/SE2020/050387
§ 371 (c)(1),
(2) Date: Oct. 14, 2022

(87) PCT Pub. No.: WO2021/211026
PCT Pub. Date: Oct. 21, 2021

(65) Prior Publication Data

US 2023/0163439 A1 May 25, 2023

(51) Int. Cl.
*H01P 1/30* (2006.01)
*H01P 1/207* (2006.01)
(Continued)

(52) U.S. Cl.
CPC .............. *H01P 7/088* (2013.01); *H01P 1/207* (2013.01); *H01P 1/30* (2013.01); *H01P 7/065* (2013.01)

(58) Field of Classification Search
CPC .... H01P 1/207; H01P 1/30; H01P 3/12; H01P 3/14; H01P 7/00; H01P 7/06; G01K 5/62
See application file for complete search history.

(56) References Cited

U.S. PATENT DOCUMENTS 2,114,846 A 4/1938 Little
4,057,772 A 11/1977 Basil, Jr. et al.
(Continued)

FOREIGN PATENT DOCUMENTS

DE 4029410 A1 3/1992
DE 10306839 A1 8/2004
(Continued)

OTHER PUBLICATIONS

International Search Report and Written Opinion dated Dec. 22, 2020 in International Application No. PCT/SE2020/050387 (15 pages).

*Primary Examiner* — Stephen E. Jones
(74) *Attorney, Agent, or Firm* — Rothwell, Figg, Ernst & Manbeck, P.C.

(57) ABSTRACT

The present invention relates to a tunable waveguide resonator and a method of tuning a frequency of the tunable waveguide resonator. The waveguide resonator comprises a waveguide part having a plurality of walls where one of the plurality of walls at least partly comprises a tuning element. The tuning element has a first main surface facing toward a first main surface of an inner wall of one other wall of the plurality of walls. The tuning element is caused to, in response to a change in a temperature of the tuning element be reversibly displaced with respect to a reference plane of the first main surface of the tuning element along an extension perpendicular to the first main surface of the one other inner wall and whereby changing a dimension of a cavity of the tunable wave-guide resonator.

14 Claims, 6 Drawing Sheets

Section A-A

(51) Int. Cl.
*H01P 7/06* (2006.01)
*H01P 7/08* (2006.01)

(56) References Cited

U.S. PATENT DOCUMENTS

| | | | | | |
|---|---|---|---|---|---|
| 4,488,132 | A | | 12/1984 | Collins et al. | |
| 4,677,403 | A | * | 6/1987 | Kich | H01P 7/06 333/229 |
| 5,867,077 | A | * | 2/1999 | Lundquist | H01P 1/207 333/229 |
| 8,988,164 | B2 | | 3/2015 | Arnold et al. | |
| 2008/0315974 | A1 | | 12/2008 | Lagorsse et al. | |

FOREIGN PATENT DOCUMENTS

| | | | |
|---|---|---|---|
| JP | 5518863 | U | 2/1980 |
| JP | 2009267692 | A | 11/2009 |
| WO | 87/03745 | A1 | 6/1987 |
| WO | 2006/104233 | A1 | 10/2006 |
| WO | 2019/210980 | A1 | 11/2019 |
| WO | 2019/242859 | A1 | 12/2019 |

* cited by examiner

TUNABLE WAVEGUIDE RESONATOR

CROSS REFERENCE TO RELATED APPLICATIONS

This application is a 35 U.S.C. § 371 National Stage of International Patent Application No. PCT/SE2020/050387, filed Apr. 15, 2020.

TECHNICAL FIELD

The present invention relates to a tunable waveguide resonator and a method of frequency tuning for the tunable waveguide resonator, wherein the waveguide resonator comprises a tuning element arranged therein.

BACKGROUND

In wireless communication networks there are various radio equipment that comprise a least some form of a resonator for example used in filters, oscillators such as Voltage Controlled Oscillators (VCOs), or short haul diplexers and similar.

One of the more recent trends calling for special requirements on resonator design, is the millimeter-wave (mmW) domain which is becoming notably popular thus raising the bar for demands on low phase noise for the frequency generation. The phase noise limitations in oscillators are often the bottleneck for more complex modulation in a communication system and for the resolution and range in radar systems.

Tunability is also another important factor being considered in design of resonators for mmW applications, with its practical implementation depending on availability of the tunable resonators with a high Q-factor, which means low losses and low phase noise. It is also important that a tunable resonator is reliable and inexpensive to produce.

Based on the intended application, a resonator can be built from discrete LC components, dielectric resonators, waveguide cavities or variants of these. One common tuning approach is electrical tuning of the cavities. The tuning element can be a varactor diode, ferroelectric material or some other variable reactance structure. The total Q of a resonator structure depends on the combined resistive losses of the respective components.

However, in all existing solutions, the common problem is that as soon as a tuning element is coupled to the waveguide cavity resonator, the losses of the tuning element will lower the Q factor and thereby the phase noise increases. The tighter the coupling between the tuning element and the resonator, the wider bandwidths may be obtained, alongside more losses, which in turn leads to increase in the phase noise.

Several other solutions use mechanical tuning approach for tuning waveguide cavities where e.g. one side is moved and typically is connected to the cavity wall by sliding contacts. Such a design results in relatively high insertion losses, meaning that a high Q factor cannot be achieved.

In a mechanical tuning approach disclosed in WO 2016/058642, the cavity comprises a tuning device comprising an electrically conducting wall part which is mechanically movable, thus making it possible to adjust a distance within the cavity. A support wall by means of a sliding adjustment arrangement is pushed against the movable wall part and this changes the distance inside the cavity which results in change of frequency. However, in this approach a manual knob is used for mechanical adjustment of the distance which may not result in accurate adjustments. Alternatively, moving the sliding adjustment arrangement in a controlled manner, requires using an electrical motor which may lead to increased production complexity, malfunctioning and higher costs.

There is thus a need for a tunable waveguide resonator and an improved tuning of frequencies that delivers a high Q-factor, wide spurious free band and is also compact.

SUMMARY

It is an object of the present invention to set forth an apparatus and a method for providing improved and more reliable tunable high Q-factor waveguide cavity resonators. This and other objects of the present invention are defined in the appended set of claims. The dependent claims define several embodiments of the present invention.

The term exemplary in the present disclosure is to be construed as an example, instance or illustration.

According to a first aspect of the present invention there is provided a tunable waveguide resonator comprising a waveguide part having a plurality of walls. One of the plurality of walls at least partly comprises a tuning element, wherein the tuning element has a first main surface, facing toward a first main surface of an inner wall of one other wall of the plurality of walls. The tuning element is caused to, in response to a change in a temperature of the tuning element, be reversibly displaced with respect to a reference plane of the first main surface of the tuning element along an extension perpendicular to the first main surface of the one other inner wall. Whereby, a dimension of a cavity of the tunable waveguide resonator is changed.

According to one exemplary embodiment of the present invention, the tuning element may be configured to be displaced when the temperature of the tuning element is increased. Such that a portion of the tuning element may be caused to bend out of the references plane along the extension perpendicular to the first main surface of the one other inner wall.

In some embodiments, the tunable waveguide resonator may be configured such that a resonance frequency of the tunable waveguide resonator can be tuned corresponding to a distance by which the dimension of the cavity of the tunable waveguide resonator may be changed upon the tuning element being displaced in response to the change in the temperature of the tuning element.

In yet another exemplary embodiment according to the present invention, one of the plurality of the walls may at least partly comprise an opening. Such that the tuning element when mounted on the wall of the waveguide part, may extend along the entire length of the opening whereby sealing the opening.

In some embodiments, the tuning element may be mounted on the waveguide part by means of attachment means. In some embodiments, the attachment means may comprise any one of a screw, a glue portion, or a solder pad. In other embodiments, the attachment means may comprise any combination of screws, glue portions, or solder pads or any other attachment and tightening means.

In yet another embodiment according to the present invention, the tuning element may comprise a membrane comprising a first sheet of a first metal and a first sheet of a second metal. The first sheet of the first metal may be arranged on a surface of the first sheet of the second metal, wherein the first metal may be different from the second metal. According to another exemplary embodiment of the present invention, the membrane may comprise a bi-metallic membrane, wherein the first sheet of the first metal may have a thermal expansion coefficient which is greater than the thermal expansion coefficient of the first sheet of the second metal. According to one exemplary embodiment, the bi-metallic membrane may be a bi-metallic strip. Where, the first metal in the bi-metallic strip may be brass and the second metal in the bi-metallic strip may be steel.

Accordingly, it has been realized by the inventors that it is advantageous to provide the cavity of the tunable waveguide resonator with a tuning element which is in the form of a bi-metallic membrane configured to be displaced and change shape i.e. bend out of its initial shape and position in response to a change in the temperature of the bi-metallic membrane. This way it is possible to tune the frequency of the waveguide resonator in a simple, controllable, accurate and cost-effective manner while maintaining a high Q-factor of the cavity. Furthermore, low phase noise values can also be achieved by such a resonator.

According to an embodiment of the present invention, the tuning element may be electrically conducting. The tuning element may be configured such that when an electric current passes through the tuning element, the temperature of the tuning element may be caused to change.

In some other exemplary embodiments, a thermo-element may be arranged at a predetermined distance (D) from the reference plane of the tuning element, wherein in response to a change in a temperature of the thermo-element, the temperature of the tuning element may be caused to change.

According to some other embodiments of the present invention, the waveguide resonator may further comprise processing circuitry for determining a deviation in a selected working frequency of the waveguide resonator. Where the processing circuitry may be further configured to change the temperature of the tuning element by means of a temperature adjusting means based on the determining and compensate for the deviation by tuning the selected working frequency of the waveguide resonator.

According to a second aspect of the present invention, there is provided a method for tuning a frequency of a tunable waveguide resonator comprising a waveguide part having a plurality of walls. One of the plurality of walls at least partly comprises a tuning element. Wherein the tuning element has a first main surface, facing toward a first main surface of an inner wall of one other wall of the plurality of walls. Wherein the method comprises:

- Changing a temperature of the tuning element;
- Causing the tuning element to be reversibly displaced along an extension perpendicular to the first main surface of the one other inner wall in response to the change in the temperature of the tuning element;
- Causing a dimension of a cavity of the tunable waveguide resonator to change in response to the tuning element being reversibly displaced;
- Tuning a frequency of the tunable waveguide resonator by the change in the dimension of the cavity.

According to one exemplary embodiment, the method may further comprise:

- Providing a temperature adjusting means for changing the temperature of the tuning element;
- Changing the temperature of the tuning element by the temperature adjusting means.

According to yet another exemplary embodiment of the present invention, the method may further comprise:

- Determining, by means of a processing circuitry a deviation in a selected working frequency of the waveguide resonator;
- Changing the temperature of the tuning element by means of the temperature adjusting means based on said determining;
- Compensating for the deviation by tuning the selected working frequency of the waveguide resonator corresponding to the change in the dimension of the cavity.

In some embodiments, the tunable element may be electrically conducting and wherein the method may further comprise:

- Tuning the frequency of the tunable waveguide resonator by electrically connecting the tunable element to an electric current source such that an electric current passes through the tuning element, and causing the tuning element to be reversibly displaced in response to the change in the temperature of the tuning element.

In some other exemplary embodiments of the present invention, a thermo-element may be arranged at a predetermined distance from the reference plane of the tuning element, wherein the method may further comprise:

- Changing a temperature of the thermo-element;
- Causing a change in the temperature of the tuning element in response to the change in the temperature of the thermo-element;
- Tuning the frequency of the tunable waveguide resonator by causing the tuning element to be reversibly displaced in response to the change in the temperature of the tuning element.

DETAILED DESCRIPTION

Figure 1:
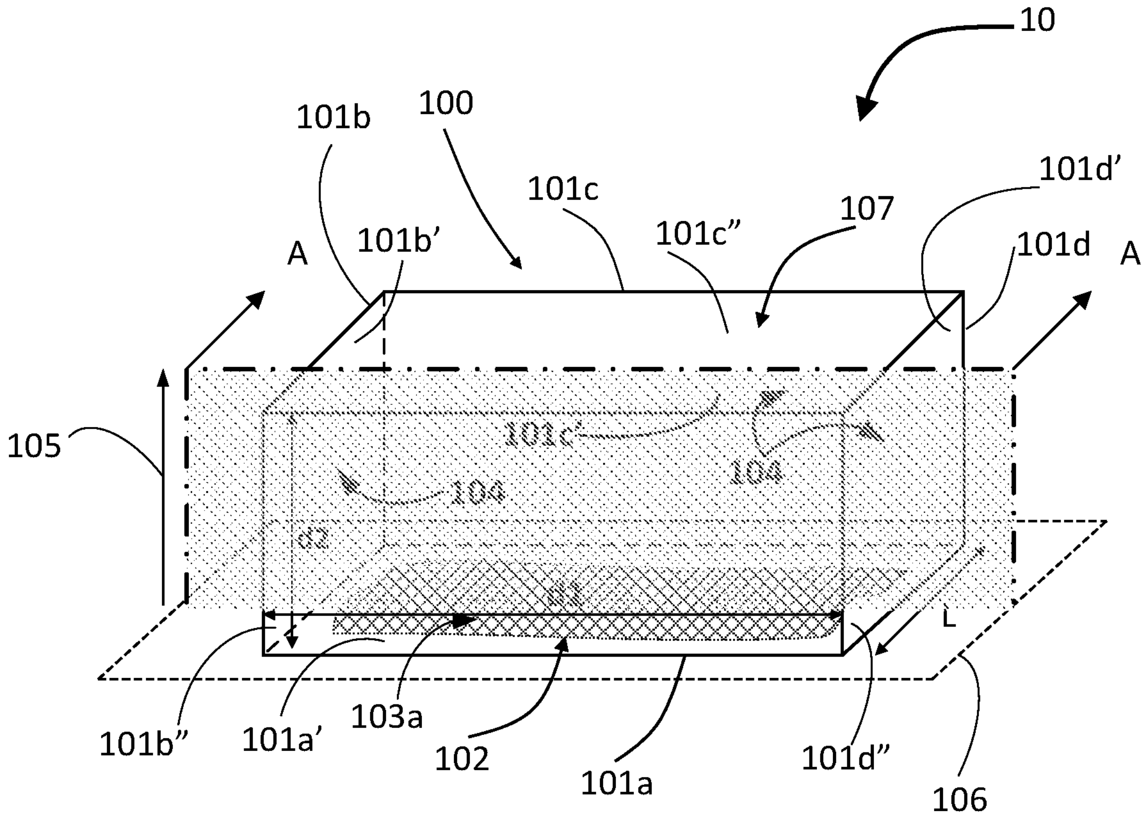
FIG. 1 shows a schematic perspective view of a tunable waveguide resonator comprising a waveguide part and a tuning element in accordance with an embodiment of the present invention.

Aspects and various embodiments of the present disclosure will now be described more fully hereinafter with reference to the accompanying drawings. The different devices, systems, computer programs and methods disclosed herein can, however, be realized in many different forms and should not be construed as being limited to the aspects and embodiments set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 shows a schematic perspective view of a waveguide part 100 of a tunable waveguide resonator 10 according to one embodiment of the present invention. The waveguide resonator 10 comprises the waveguide part 100. The waveguide part 100 of FIG. 1 has a rectangular shape, with a longitudinal extension L. The rectangular cross-section A-A has a first length d1 and a second length d2. The skilled person however, would readily understand that the waveguide part 100 may have any other appropriate shape or geometry, for example in some embodiments the waveguide part 100 may be cylindrical (not shown). The waveguide part 100 comprises a plurality of walls e.g. a first 101*a*, a second 101*b*, a third 101*c* and a fourth 101*d* wall, each wall comprising an inner wall e.g. a first 101*a*', a second 101*b*', a third 101*c*', and a fourth 101*d*' inner wall, also shown in the cross-section A-A in FIGS. 2A-C. Each wall also comprises an outer wall e.g. a first 101*a*", a second 101*b*", a third 101*c*", and a fourth 101*d*" outer wall corresponding to the inner walls 101*a*', 101*b*', 101*c*', 101*d*'. The waveguide resonator 10 further comprises a waveguide cavity 107, which is the opening formed by arranging the walls the waveguide part 100. The inner walls 101*a*', 101*b*', 101*c*', 101*d*' of the waveguide part 100 are electrically conductive. The waveguide resonator 10 may have other ports and openings (not shown) for coupling to other electrical and/or mechanical components in a circuit, such as active circuits such as an MMIC (Monolithic Microwave Integrated Circuit), or amplifiers such as reflection amplifiers, etc.

Each inner wall 101*a*', 101*b*', 101*c*', 101*d*' has a first main surface 104 which faces toward a first main surface 104 of one other inner wall. As an example, inner wall 101*b*' and 101*d*' face each other i.e. each of the two inner walls 101*b*' and 101*d*' arranged to be substantially parallel to each other, has a first main surface 104 which faces toward the first main surface 104 of the other inner wall.

The waveguide resonator 10 further comprises a tuning element 102. The tuning element 102 in this embodiment is comprised in the waveguide part 100 of the tunable waveguide resonator 10. In the embodiment of FIG. 1, one of the walls, wall 101*a*, of the waveguide part 100 at least partly comprises the tuning element 102 mounted thereto. Thus, the tuning element 102 at least partly forms a part/portion of the wall 101*a*. The tuning element 102 has a first main surface 103*a*, also referred to as the top surface 103*a*. The first main surface 103*a* forms a portion of the main surface 104 of the inner wall 101*a*' which in some embodiments covers the entire main surface 104 of the inner wall 101*a*'. In some embodiments, the portion covers only a part of the first main surface 104 of the inner wall 101*a*'. The area of the first main surface 103*a* thus corresponds to the area of the portion of the main surface 104. In some embodiments, other walls 101*b*, 101*c*, 101*d* may comprise a tuning element 102 and consequently the first main surface 103*a* forms a portion of the first main surface 104 of the inner walls 101*b*', 101*c*' and 101*d*'.

The first main surface 103*a* of the tuning element 102 comprised in wall 101*a*' in this embodiment is arranged to face toward the first main surface 104 of one other inner wall e.g. the third inner wall 101*c*'.

The tuning element 102 comprises a bi-metallic membrane. the bi-metallic membrane 102 is for example a strip of metal made of at least two sheets of different metals. As shown as a matter of example in FIG. 2D, in a side cross-sectional view of a cut-out part of the membrane 102, the bi-metallic membrane 102 is made of a first sheet 102' of a first metal arranged on a surface 102"*a* of a first sheet 102" of a second metal. The two metals have different expansion rates when exposed to temperature changes. The first metal has a higher thermal expansion coefficient compared to the second metal. This way, when heated up from its initial temperature, the bi-metallic membrane 102 will bend in a first direction compared to its initial flat position e.g. a direction perpendicular to a plane of the membrane in its flat position. If the bi-metallic membrane 102 is cooled down from its initial temperature, it will bend in an opposite direction to the first direction. A displacement of Δd with respect to the reference plane 106 occurs as a response of the membrane 102 to the increase in temperature. The first metal in this embodiment is brass and the second metal is steel. The skilled person however would consider other combinations of metals suitable for achieving the desired tuning in the tunable waveguide resonator for intended temperatures and applications. Other examples of metals without inadvertently limiting the present invention may include copper and steel, or brass and iron or any other standard bi-metal material or alloy.

The tuning element 102 can in other embodiments be a metallic foil which is suitable for reversibly changing its shape when exposed to temperature changes and thus result in a change in a dimension of the cavity of the resonator. In other embodiments the tuning element 102 may comprise a plurality of stacks of a bi-metallic membranes, e.g. a second or a third sheet of the first and second metals arranged in stacks.

In the following the tuning element 102 may also frequently be referred to as the bi-metallic membrane 102.

The tuning element 102 is, in response to a change in a temperature of the tuning element 102, caused to be reversibly displaced with respect to a reference plane 106 of the first main surface 103*a* of the tuning element 102 such that a portion 102*a* (see FIGS. 3A and 3B) of the tuning element 102 is caused to be displaced along an extension 105 perpendicular to the first main surface 104 of the one other inner wall 101*c*', whereby changing a dimension d2 of the tunable waveguide cavity 107.

The second length d2 of the waveguide part 100 is to be understood as the distance between the two inner walls, the first 101*a*' and the third 101*c*' inner wall. In other words, the dimension d2 of the cavity 107 which is changed when the tuning element is caused to be displaced is the same as changing the second length d2 i.e. the distance between the two parallel inner walls 101*a*' and 101*c*'.

When in use, by changing temperature of the tuning element 102 using a temperature adjusting means, the portion 102*a* of the tuning element 102 is moved towards the first main surface 104 of the opposite inner wall 101*c*' by projecting out of the reference plane 106 of the first main surface 103*a* of the tuning element 102. In some embodiments the portion 102*a* forms only a part of the tuning element 102. In other embodiments the portion 102*a* extends along and forms the entire length of the tuning element 102.

The area and volumetric thermal expansion of the bi-metallic membrane 102 can be isotropic in some embodiments. In other embodiments the thermal expansion may be anisotropic.

The membrane may be manufactured by any customary production technologies in the field such as 3D printing.

By reversibly here it is meant to be understood that when the temperature of the tuning element is increased with the amount ΔT from an initial temperature T e.g. ambient temperature to T+ΔT, the tuning element 102 is accordingly displaced as described above. However, when the temperature of the tuning element 102 returns to T, the tuning element 102 is moved in the opposite direction and returns to its initial position.

Figure 2A:
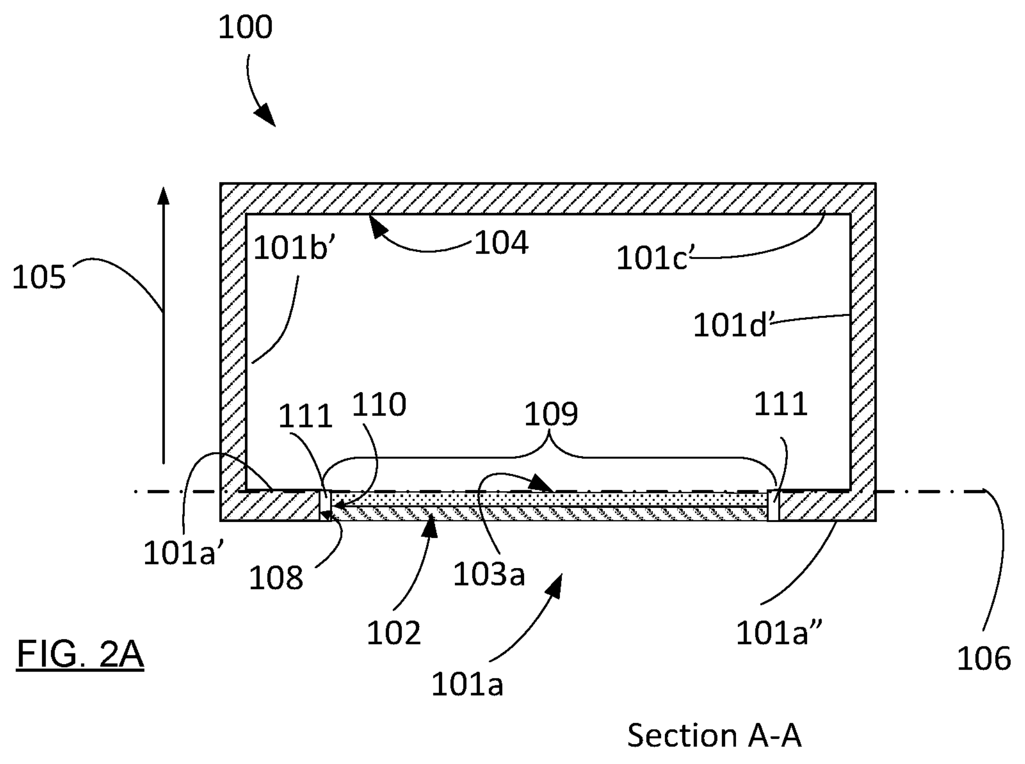
FIGS. 2A-C Illustrate schematic side view of a cross section A-A of the waveguide part of FIG. 1 in accordance with some embodiments of the present invention.

As shown in FIG. 2A, the tunable element 102 may be comprised only partly in one of the walls 101*a* of the waveguide part 100 forming a part of the wall 101*a*. This way, the first main surface 103*a* of the tuning element 102 only partly forms a portion of the inner wall 101*a'*.

Figure 2B:
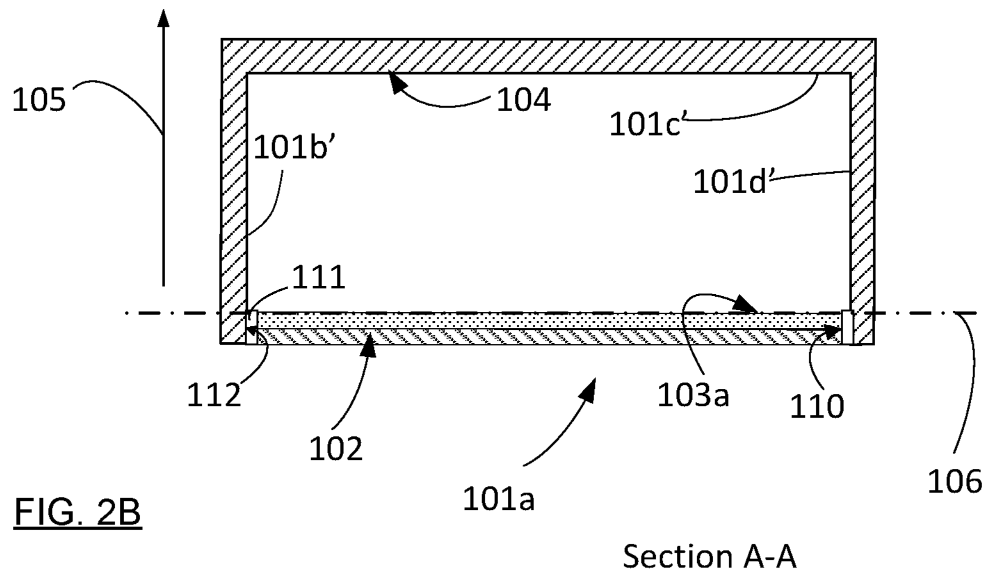
Figure 2C:
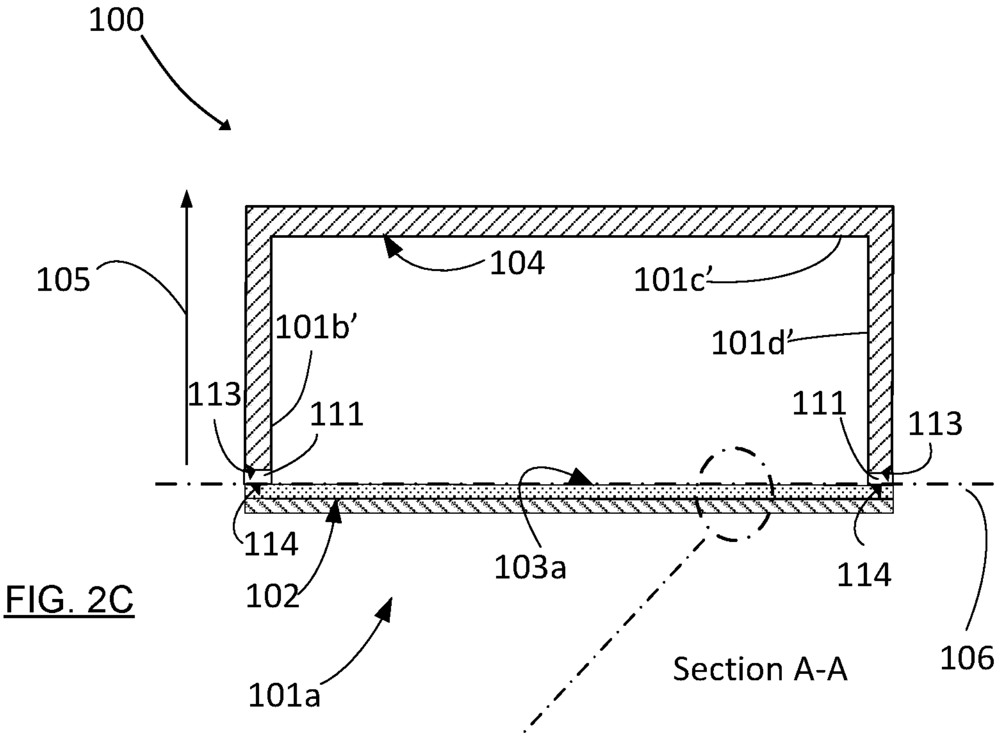
Figure 2D:
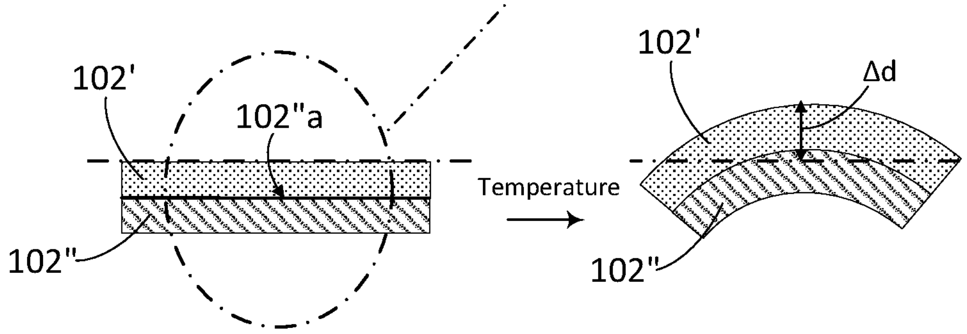
FIG. 2D shows a schematic side view of a cross-sectional cut-out part of the tuning element in accordance with an embodiment of the present invention.

Alternatively or additionally, the wall 101*a* of the waveguide part 100 completely comprises the tuning element 102 as shown in FIGS. 2B and 2C. In other words, the tuning element 102 completely forms one of the walls 101*a* of the waveguide part 100 and thus the first main surface 103*a* of the tuning element 102 forms a portion of the inner wall 101*a'* extending entirely along the length of the inner wall 101*a'*.

In some embodiments, the bi-metallic membrane 102 is attached to the end portions 108 of the walls as shown in FIG. 2A, e.g. where the bi-metallic membrane 102 is only partly comprised in one of the walls 101*a* of the waveguide part 100. The end portions 108 here are to be construed as the end portions of the wall 101*a* of the waveguide part 100 leading to an opening 109 in the wall 101*a*. In FIG. 2A, the bi-metallic membrane 102 comprised in the wall 101*a* is shown to have fully covered the length of the opening 109 and the bi-metallic membrane 102 has thus sealed the opening 109. The top surface 103*a* of the tuning element 102 forms the portion of the main surface 104 of the inner wall 101*a'* which covers the entire length of the opening 109. The opening 109 may extend along a part of the wall 101*a* or the entire length of the wall 101*a*, i.e. when the wall 101*a* is removed and replaced by the tuning element 102 as shown in FIGS. 2B and 2C.

The bi-metallic membrane 102 is attached to the waveguide part 100 at its end portions 110 by means of attachment means 111. As shown in FIG. 2A, the attachment means 111 are arranged between the end portions 108 of the wall 101*a* and end portions 110 of the bi-metallic membrane 102, thus attaching the bi-metallic membrane 102 to the wall 101*a* of the waveguide part 100.

In some embodiment the bi-metallic membrane 102 is attached to a portion of the inner walls adjacent the wall comprising the bi-metallic membrane 102. For example, as shown in FIG. 2B when the bi-metallic membrane 102 is comprised in wall 101*a*, the bi-metallic membrane 102 is attached to a portion e.g. an end portion 112 of the inner walls 101*b'* and 101*d'* by means of attachment means 111. The bi-metallic membrane 102 is preferably attached to the end portions 112 of the inner walls 101*b'*, 101*d'* over the entire length of the inner walls i.e. over the entire longitudinal extension L of the inner walls 101*b'*, 101*d'* as shown in FIG. 1. However, it is conceivable that the bi-metallic membrane 102 is attached to the inner walls only over some points (not shown) along the longitudinal extension of the inner walls 101*b'*, 101*d'*.

Moving on, the bi-metallic membrane 102 in some embodiments is attached to the bottom part of waveguide part 100 i.e. to the bottom portion of the walls of the waveguide part 100. For example, as shown in FIG. 2C, the bi-metallic membrane 102 is attached to the bottom portions 113 of two of the walls 101*b* and 101*d*. The bi-metallic membrane 102 is preferably attached to the bottom portions 113 of the walls 101*b*, 101*d* over the entire length of the walls i.e. over the entire longitudinal extension L of the walls 101*b*, 101*d* as shown in FIG. 1. However, it is conceivable that the bi-metallic membrane 102 is attached to the walls only over some points along the longitudinal extension of the walls 101*b*, 101*d*. In this embodiment an end portion 114 of the top surface 103*a* of the bi-metallic membrane 102 is attached to the bottom portions 113 by means of attachment means 111.

The end portions 114 of the other sides of the bi-metallic membrane 102 are attached in the same way to the bottom portions of the other remaining walls of the waveguide part 100 (not shown). This means that the waveguide part 100 is physically as well as electrically sealed by the bi-metallic membrane 102.

The attachment means 111 in the above discussed embodiments may be screws, glue portions/pads, solder pads/bumps or some other tightening or attachment means.

In some embodiments, the tunable element 102 may be partly or fully comprised in multiple walls e.g. in two or in three or in four walls of the waveguide part 100. (not shown)

Figure 3A:
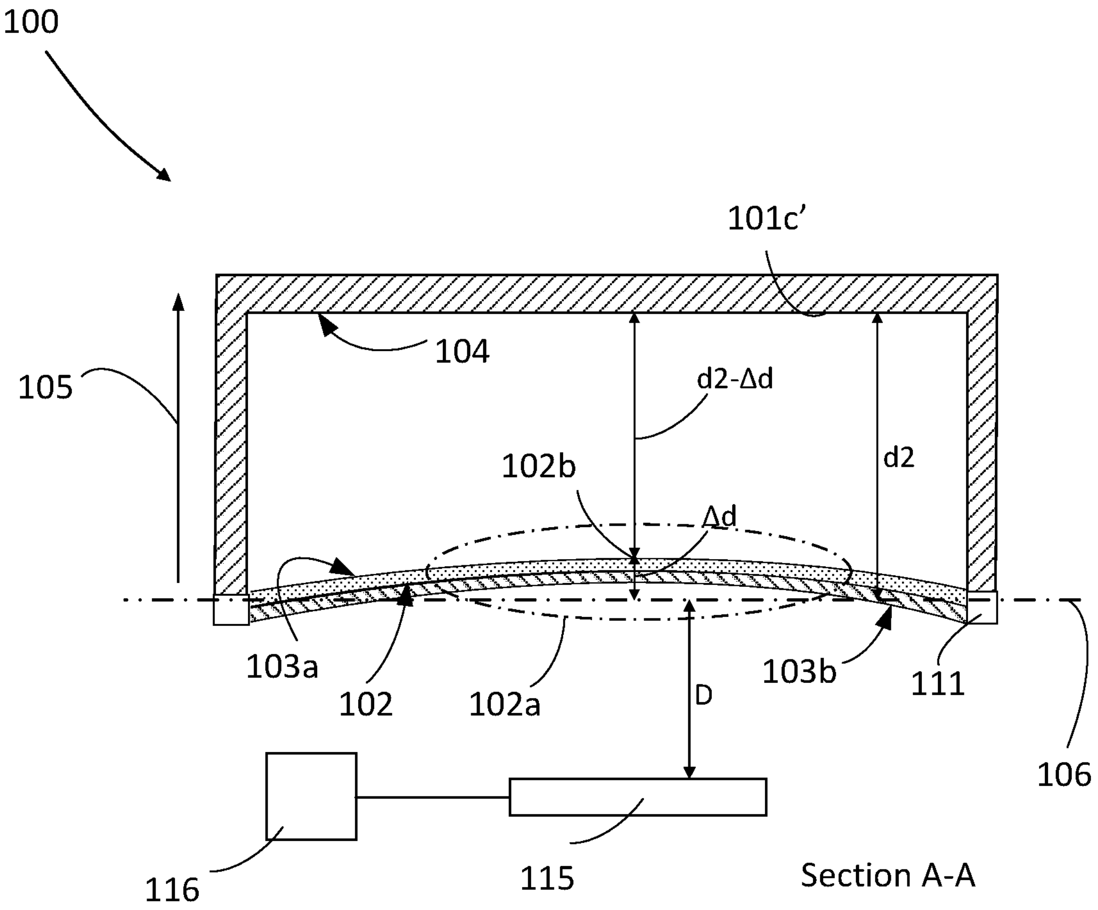
FIGS. 3A-B show schematic side view of the cross-section A-A of the waveguide part of the tunable waveguide resonator in accordance with some other embodiments of the present invention.
Figure 3B:
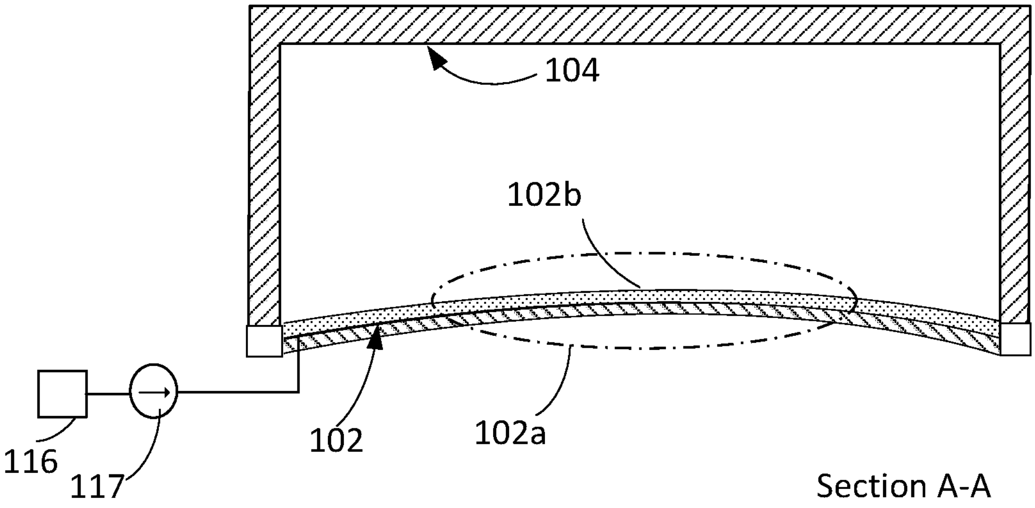

FIGS. 3A and 3B illustrate the waveguide part 100 in use, wherein the wall 101*a* is entirely formed of the tuning element 102. The bi-metallic membrane 102 has a second main surface 103*b* (bottom surface 103*b*) which in this embodiment forms the outer wall 101*a''* of the wall 101*a*.

In the embodiment of FIG. 3A, the temperature adjusting means is a thermo-element 115 arranged at a predetermined distance "D" from the reference plane 106. It can also be said that the thermo-element 115 is arranged at a predetermined distance from the second main surface 103*b* of the tuning element 102, i.e. arranged under the bottom surface 103*b* of the bi-metallic membrane 102. Where in response to a change in the temperature of the thermo-element 115, the temperature of the tuning element 102 is caused to change such that the bi-metallic membrane 102 is displaced from its initial flat position to a tuning or bent position whereby changing the dimension d2 of the cavity 107 of the tunable waveguide resonator 10.

In some embodiments the distance "D" may be varied during operation e.g. by being mounted on an adjustable stage or platform controlled by a user or processing circuitry 116. This provides for several advantages such as calibration of the thermo-element, maintenance, test measurements, or adjustment of the distance during a tuning session based on the frequency readout.

When the bi-metallic membrane 102 is in its initial position, the first main surface 103*a* and the second main surface 103*b* are substantially parallel with the reference plane 106. In the initial position, the dimension d2 of the cavity 107 which is changed when the tuning element is caused to be displaced from the initial position to the tuning position is the same as the second length d2 of the waveguide part 100 i.e. the distance between the two parallel inner walls 101*a'* and 101*c'*.

By using the thermo-element 115, the temperature of the bi-metallic membrane 102 is changed indirectly e.g. the membrane 102 is heated up or cooled down indirectly. The thermo-element can for example be a Peltier element.

When the temperature of the thermo-element changes e.g. when a temperature increase from T to T+ΔT is applied to the thermo-element, the bi-metallic membrane 102 is caused to be displaced corresponding to this increase. This means that the bi-metallic membrane 102 moves along the extension 105 perpendicular to the first main surface 104 of the inner wall 101*c'*. In this embodiment the temperature increase of ΔT causes the bi-metallic membrane 102 to move towards the inner wall 101*c'*. More specifically, when saying the bi-metallic membrane 102 is caused to be displaced, it is meant that the first main surface 103*a* of the bi-metallic membrane 102 moves towards the first main surface 104 of the inner wall 101*c'*. For example, the portion 102*a* of the bi-metallic membrane 102 is caused to be displaced towards the first main surface 104 of the inner wall 101*c*' such that the highest point 102*b* of the portion 102*a* of the bi-metallic membrane 102, when forming an arc shape, is displaced a corresponding distance of Δd, with respect to the reference plane 106, along the extension 105. Highest point of the arc shape is to be construed with respect to a chord of a circle comprising the arc, wherein the chord connects the two endpoints of the arc.

This movement of the bi-metallic membrane 102 cause the dimension d2 of the cavity 107 to decrease to d2-Δd at the highest point 102*b* of the portion 102*a*.

If the temperature of the thermo-element 115 is then decreased from T+ΔT to T, the tuning element 102 and more specifically the highest point 102*b* of the portion 102*a* of the tuning element 102 is moved in the opposite direction along the extension 105 away from the first main surface 104 and towards its initial position. This causes the dimension d2-Δd of the cavity 107 to increase and ultimately return to the initial value of d2.

It must be clear to the skilled person that the other portions of the bi-metallic membrane 102 other than the portion 102*a* as well as other points than the highest point 102*b* of the portion 102*a* will experience a slightly different thermal expansion and distance alteration than Δd and thus the dimension change over the entire length of the bi-metallic membrane 102 will graduate between d2 and d2-Δd. Stating differently, the bi-metallic membrane 102 forms the arc shape between the two attachment points.

By employing the above mechanism, the inventors have found that the dimension or volume of the cavity 107 can be accurately adjusted which results in a change in frequency of the waveguide resonator 10. For example, when the bi-metallic membrane 102 is heated up, the volume of the cavity will be reduced as discussed above in detail and this will lead to an increase in the frequency of the waveguide resonator, thus a convenient frequency tuning is achieved. This way, the variations of the ambient or working temperature of the tunable waveguide resonator 10 is advantageously compensated for. The present invention advantageously makes possible to tune the resonance frequency of the cavity 107 of the waveguide resonator 10 without sacrificing the high Q-factor of the cavity 107. Further, the present invention eliminates the need for installing a varactor diode inside the waveguide cavity 107 which when installed in the cavity 107, negatively affects the high Q-factor of the cavity 107 of the waveguide resonator 10. The waveguide resonator 10 according to the present invention can also achieve considerably low phase noise values compared to standard available solutions. For instance, a standard VCO available on the market today can deliver a −114 dBc phase noise at a central frequency of 10 GHz. As an example, in comparison, the VCO comprising a waveguide cavity resonator 10 according to the present invention can deliver an improvement of at least 19 dB at the same working frequency over the above standard VCO.

In some embodiments the dimensions of the cavity 107 may e.g. be d1=21 mm×d2=18 mm for a central frequency of 10 GHZ. Other arrangements and dimension are clearly conceivable to the skilled person based on the working frequency of the waveguide resonator 10.

In some exemplary embodiments, the displacement (Δd) of the bi-metallic membrane 102 is in the range of 10 μm to 20 μm for a central frequency of 10 GHz. It is however conceivable that for several other working frequencies, waveguide cavities and corresponding bi-metallic membranes could be designed for achieving desired frequency tuning ranges without departing from the scope of the appended claims.

The thermo-element 115 is arranged to be accurately controllable by means of control and processing circuitry 116. This way the temperature of the thermo-element 115 can be adjusted with high precision. In some embodiments the control circuitry 116 may execute an algorithm to regulate the temperature of the thermo-element 115 such that a certain tuning position of the membrane 102 i.e. a certain frequency tuning target is constantly maintained and fluctuation in the ambient temperature, and/or working temperature of the waveguide resonator 10 are compensated for.

In another embodiment according to the present invention illustrated in FIG. 3B, the bi-metallic membrane 102 is connected to a current source 117 as the temperature adjusting means, which injects electric current through the bi-metallic membrane 102 and causes a temperature increase in the bi-metallic membrane 102 by means of direct heating compared to the indirect heating of the embodiment of FIG. 3A. The electric current source 117 may be a designated electric current source, or it may be an electric current from an output port of another component (not shown), such as a filter unit, of the electric circuitry. The working principles and advantages achieved by this embodiment of the invention is similar to that of the previous embodiments.

Furthermore, in some other embodiments, the bi-metallic membrane 102 is configured to operate in the ambient temperature and compensate only for temperature variations in the working environment of the waveguide resonator 10. In such embodiments no direct and/or indirect temperature regulating means are installed. Instead, it is the fluctuations of the ambient temperature which control the displacement of the bi-metallic membrane 102 and in such way control the volume of the cavity 107 and the changes in the frequency of the waveguide resonator 10. It is however required that a suitable combination of metals or alloys be used to construct the bi-metallic membrane 102 when it is controlled by the ambient temperature.

Figure 4:
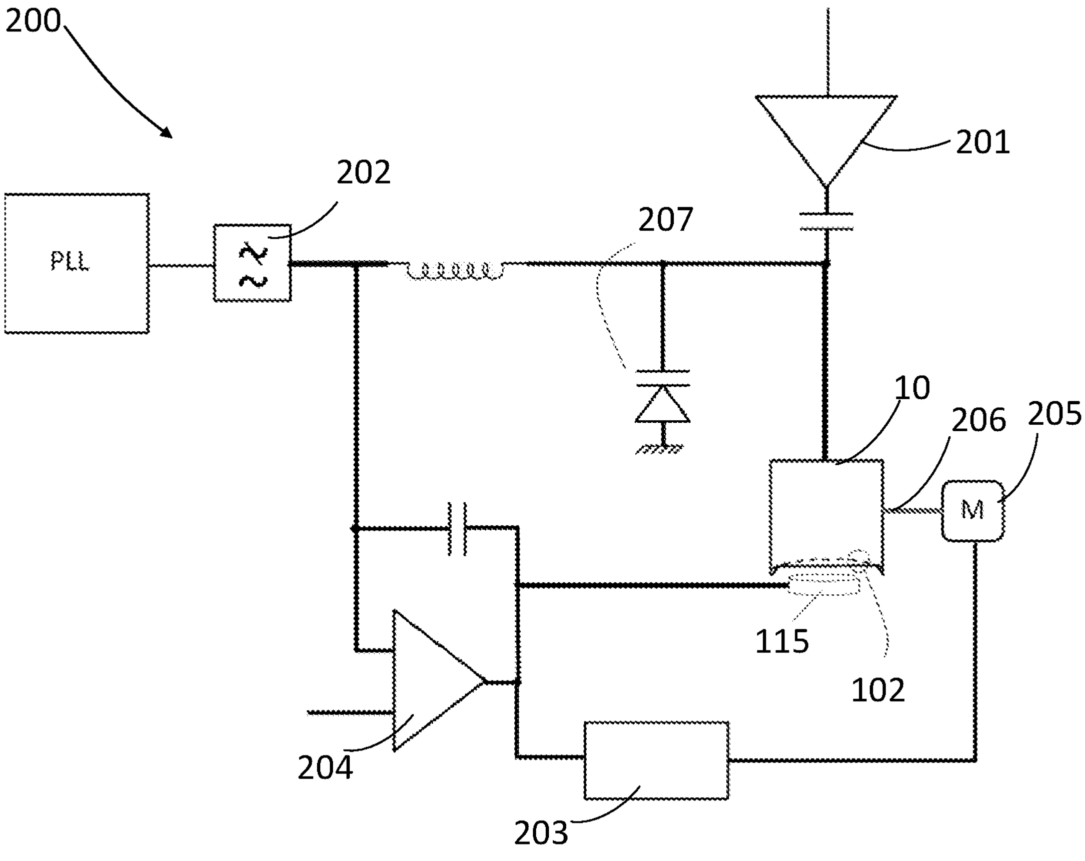
FIG. 4 shows a simplified block diagram of a circuit layout comprising the tunable waveguide resonator in accordance with an embodiment of the present invention.

FIG. 4 shows a block diagram 200 of a phase locked loop (PLL) circuit, wherein the tunable waveguide resonator 10 according to the present invention is implemented by means of example. The PLL circuit 200 comprises, a reflection amplifier 201 connected to the waveguide resonator 10, a low pass filter (LPF) 202, and processing and control circuitry including a microprocessor 203 and a comparator 204. In this example the PLL circuit includes the waveguide resonator 10 and a thermo-element 115 arranged for temperature adjustment of the bi-metallic membrane 120. The PLL circuit 200 further includes additional means for tuning the frequency of the tunable waveguide resonator 10. For example, the PLL circuit 200 comprises an electric motor 205 and a tuning screw 206 mounted onto the waveguide part 100 of the resonator 10 via e.g. an aperture (not shown) in the waveguide part 100. The tuning screw 206 may be coupled to a tuning device (not shown) located inside the waveguide part e.g. between any of the two inners wall of the waveguide part 100. The frequency of the cavity 107 can be adjusted by the motor 205 rotating the screw 206 which controls a metallic or dielectric puck inside the cavity 107. This way a broad and rather crude adjustments of the frequency of the cavity 107 is achievable. The PLL circuits additionally comprises a varactor diode 207 which is placed outside the cavity 107 of the waveguide resonator 10. Such a varactor diode 207 can be used to control small variations in frequency of the cavity 107. The motor 205, varactor diode 206 and the temperature-controlled bi-metallic membrane 102 individually and/or in combination provide the user with a great degree of control over tuning the frequency of the waveguide resonator 10 which is very advantageous.

Figure 5:
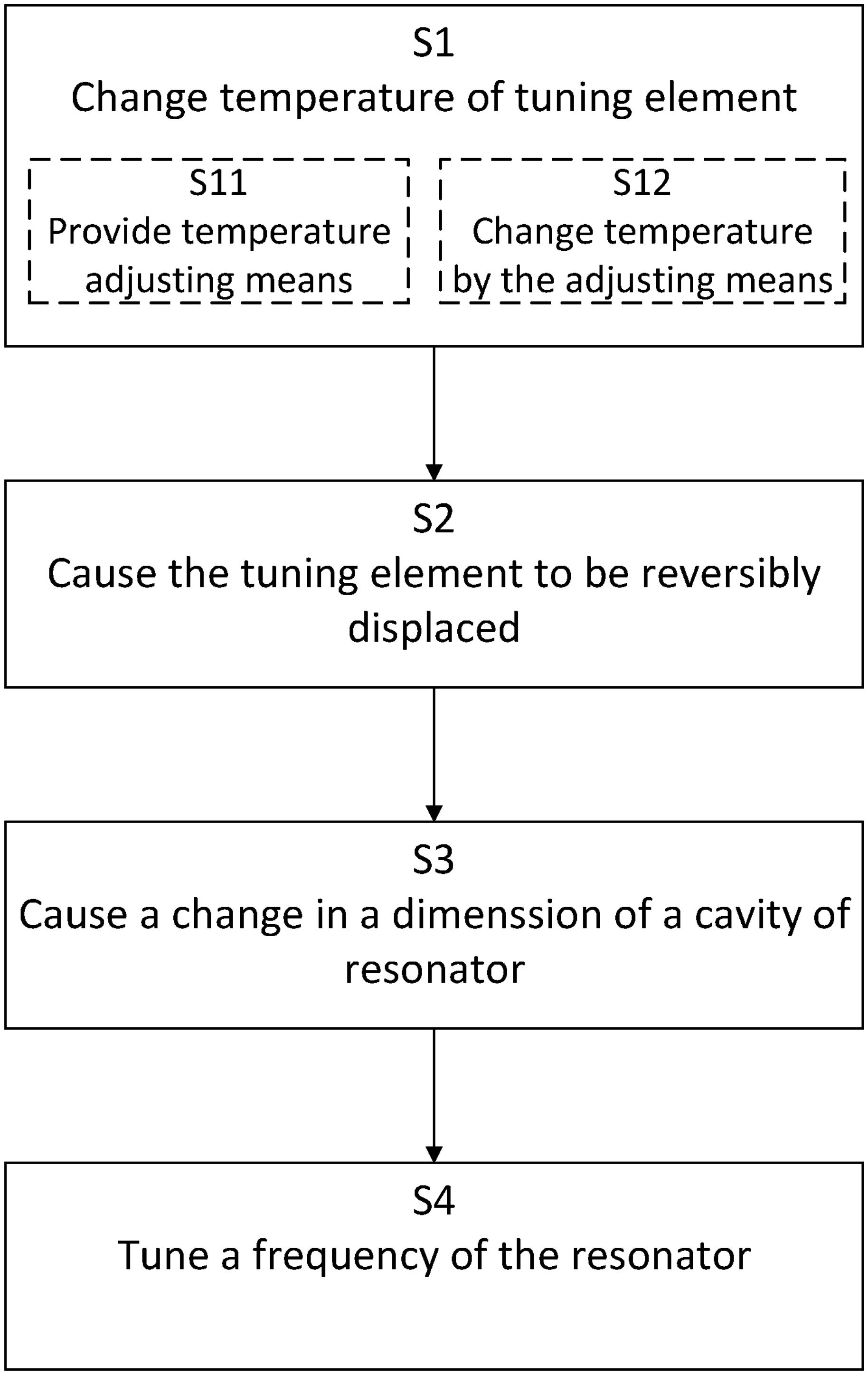
FIG. 5 shows a flowchart of some of the methods in accordance with some embodiments of the present invention.

FIG. 5 shows a flow chart of a method according to another aspect of the present into for tuning a frequency of a tunable waveguide resonator 10. The waveguide resonators 10 comprises a waveguide part 100. The waveguide part 100 comprises a plurality of walls 101*a*, 101*b*, 101*c*, 101*d* and a tuning element 102. One of the plurality of walls e.g. wall 101*a* at least partly comprises the tuning element 102, wherein the tuning element has a first main surface 103*a*, facing toward a first main surface 104 of an inner wall 101*a*', 101*b*', 101*c*', 101*d*' of one other wall e.g. inner wall 101*c*' of wall 101*c* of the plurality of walls, wherein the method comprises changing 51 the temperature of the tuning element 102, causing S2 the tuning element to be reversibly displaced along an extension 105 perpendicular to the first main surface 104 of the one other inner wall 101*c*' in response to the change in the temperature of the tuning element. The method further comprises causing S3 a dimension d2 of a cavity 107 of the tunable waveguide resonator 10 to change in response to the tuning element being reversibly displaced and tuning S4 a frequency of the tunable waveguide resonator by the change in the dimension d2 of the cavity 107.

In some embodiments the method further comprises providing S11 a temperature adjusting means 115, 117 for changing a temperature of the tuning element 102, and changing S12 the temperature of the tuning element 102 by the temperature adjusting means.

In other embodiments the bi-metallic membrane 102 may be configured to operate in the ambient temperature and compensate only for temperature variations in the working environment of the waveguide resonator 10. In such embodiments, temperature adjusting means are not required. Instead, it is the fluctuations of the ambient temperature which control the displacement of the bi-metallic membrane 102 and in such way control the volume of the cavity 107 and the cause the tuning of the frequency of the waveguide resonator 10. It is however noted that a suitable combination of metals or alloys is to be used to construct the bi-metallic membrane 102 when it is controlled by the ambient temperature.

The method can be carried out in any desired order, or parts of the method may be performed repeatedly or sequentially in different applications as desired.

In other embodiments, the method may further comprise determining S5, by means of a processing circuitry 116, 203, 204 a deviation in a selected working frequency of the waveguide resonator, and changing S6 the temperature of the tuning element by means of the temperature adjusting means 115, 117 based on the determining. The method may further comprise compensating S7 for the deviation by tuning the selected working frequency of the waveguide resonator corresponding to the change in the dimension d2 of the cavity 107. The deviation may for example be any temperature fluctuations in the working environment leading to a deviation of the frequency of the resonator. The deviation may also be caused due to mechanical vibrations or any other conceivable environmental disturbances such as wind, irradiation, and the like.

The invention claimed is:

1. A tunable waveguide resonator comprising:

a waveguide part having a plurality of walls defining a cavity of the tunable waveguide resonator, the plurality of walls comprising a first inner wall and a second inner wall, the first inner wall partly comprising a tuning element, wherein the tuning element has a first main surface, facing toward a first main surface of the second inner wall, and the tuning element is caused to, in response to an increase in a temperature of the tuning element, be reversibly displaced in a direction towards the first main surface of the second inner wall, thereby reducing a dimension of the cavity of the tunable waveguide resonator, the waveguide resonator further comprises processing circuitry for determining a deviation in a selected working frequency of the waveguide resonator and for compensating for the deviation by tuning the selected working frequency of the waveguide resonator, and the processing circuitry is further configured to increase the temperature of the tuning element by means of a temperature adjusting means based on the determining.

2. The tunable waveguide resonator of claim 1, wherein the tuning element is caused to be reversibly displaced by bending in the direction towards the first main surface of the second inner wall.

3. The tunable waveguide resonator of claim 1, wherein a resonance frequency of the tunable waveguide resonator is tuned corresponding to a change of the dimension of the cavity as a result of the increase in the temperature of the tuning element.

4. The tunable waveguide resonator of claim 1, wherein the first inner wall partly comprises an opening, and the tuning element extends along an entire length of the opening sealing the opening.

5. The tunable waveguide resonator of claim 1, wherein the tuning element is mounted on the waveguide part by means of an attachment means.

6. The tunable waveguide resonator of claim 5, wherein the attachment means comprises any one of a screw, a glue portion, or a solder pad.

7. The tunable waveguide resonator of claim 1, wherein the tuning element comprises a membrane comprising a first sheet of a first metal and a first sheet of a second metal, the first sheet of the first metal being arranged on a surface of the first sheet of the second metal, wherein the first metal is different from the second metal.

8. The tunable waveguide resonator of claim 7, wherein the membrane comprises a bi-metallic membrane, wherein the first sheet of the first metal has a thermal expansion coefficient which is greater than the thermal expansion coefficient of the first sheet of the second metal.

9. The tunable waveguide resonator of claim 8, wherein the bi-metallic membrane is a bi-metallic strip and the first metal in the bi-metallic strip is brass and the second metal in the bi-metallic strip is steel.

10. The tunable waveguide resonator of claim 1, wherein the tuning element is electrically conducting and is configured such that as a result of an electric current passing through the tuning element, the temperature of the tuning element is caused to increase.

11. A tunable waveguide resonator comprising:

a waveguide part having a plurality of walls defining a cavity of the tunable waveguide resonator, the plurality of walls comprising a first inner wall and a second inner wall, the first inner wall partly comprising a tuning element, wherein the tuning element has a first main surface, facing toward a first main surface of the second inner wall, and the tuning element is caused to, in response to an increase in a temperature of the tuning element, be reversibly displaced in a direction toward the first main surface of the second inner wall, thereby reducing a dimension of the cavity of the tunable waveguide resonator, wherein a thermo-element is arranged at a predetermined distance (D) from the second inner wall, wherein in response to a change in a temperature of the thermo-element, the temperature of the tuning element is caused to change.

12. A method for tuning a frequency of a tunable waveguide resonator, comprising a waveguide part having a plurality of walls defining a cavity of the tunable waveguide resonator, the plurality of walls comprising a first inner wall and a second inner wall, the first inner wall at least partly comprising a tuning element, wherein the tuning element has a first main surface facing toward a first main surface of the second inner wall, the method comprising:

causing the tuning element to be reversibly displaced in a direction toward the first main surface of the second inner wall, thereby reducing a dimension of the cavity of the tunable waveguide resonator and tuning a frequency of the tunable waveguide resonator, wherein causing the tuning element to be reversibly displaced in the direction toward the first main surface of the second inner wall comprises heating the tuning element, the tuning element is electrically conducting and connected to an electronic current source, and heating the tuning element comprises passing an electric current through the tuning element.

13. The method of claim 12, wherein the method further comprises:

determining, by means of processing circuitry, a deviation in a selected working frequency of the waveguide resonator; wherein heating the tuning element is based on the deviation in the selected working frequency.

14. The method of claim 12, wherein the tuning element comprises a membrane comprising a first sheet of a first metal and a first sheet of a second metal, the first sheet of the first metal being arranged on a surface of the first sheet of the second metal, wherein the first metal is different from the second metal.

* * * * *